A. LOOMIS.
MOTOR VEHICLE.
APPLICATION FILED MAY 14, 1913.

1,171,527.

Patented Feb. 15, 1916.
2 SHEETS—SHEET 1.

Witnesses:
Clair J. Coté,
Le Roi J. Williams.

Inventor:
Allen Loomis,
by Milton Tibbetts,
Attorney.

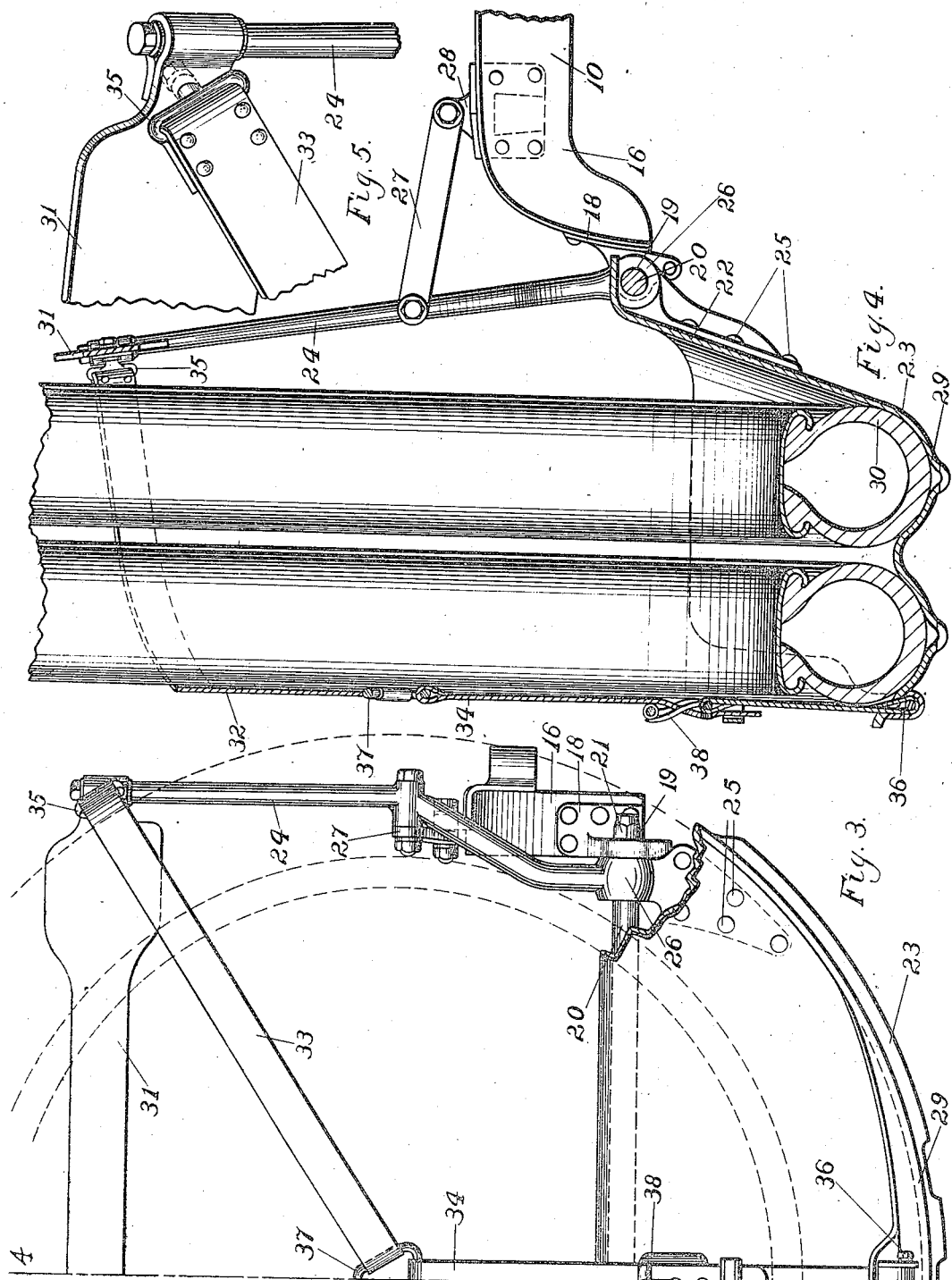

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,171,527.  Specification of Letters Patent.  Patented Feb. 15, 1916.

Application filed May 14, 1913. Serial No. 767,615.

*To all whom it may concern:*

Be it known that I, ALLEN LOOMIS, a citizen of the United States, and resident of Detroit, Wayne county, State of Michigan, have invented certain new and useful Improvements in Motor-Vehicles, of which the following is a specification.

This invention relates to motor vehicles, and particularly to means for supporting extra tires and rims thereon.

One of the objects of the invention is to provide a tire carrier of simple design, one that is comparatively easy to manufacture and to attach to the vehicle, one that is convenient in the matter of securing the tires therein and removing them therefrom, and one that holds the tires securely in place.

Another object of the invention is to so arrange the tire carrier on the vehicle chassis that the tires may be held in either substantially vertical position or slightly inclined, depending upon the type of vehicle body used.

Other objects of the invention will appear from the following description, taken in connection with the drawings, which form a part of this specification, and in which—

Figure 1:
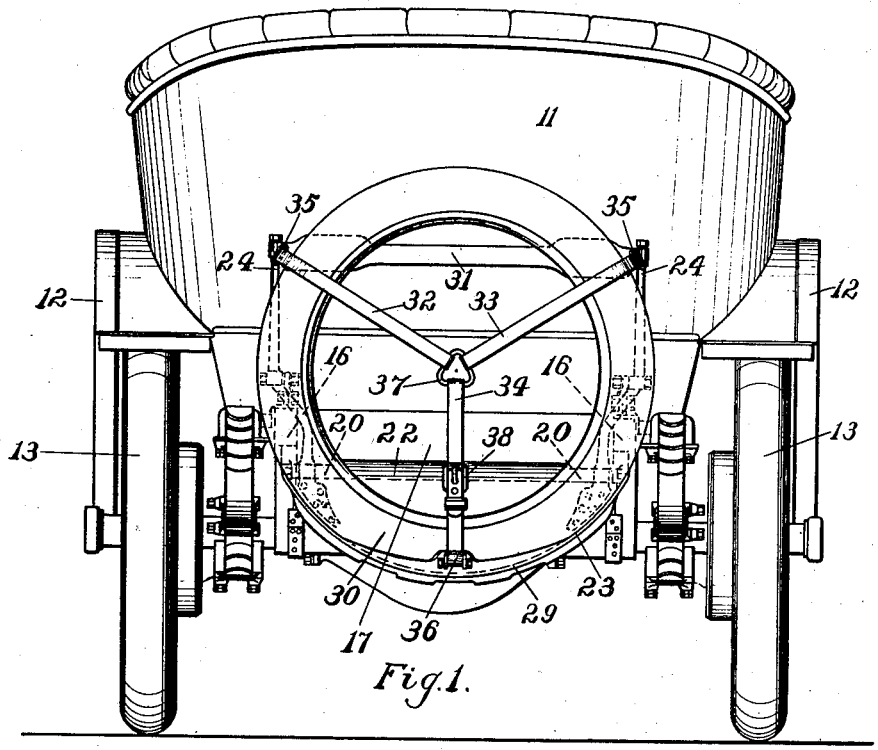
Figure 2:
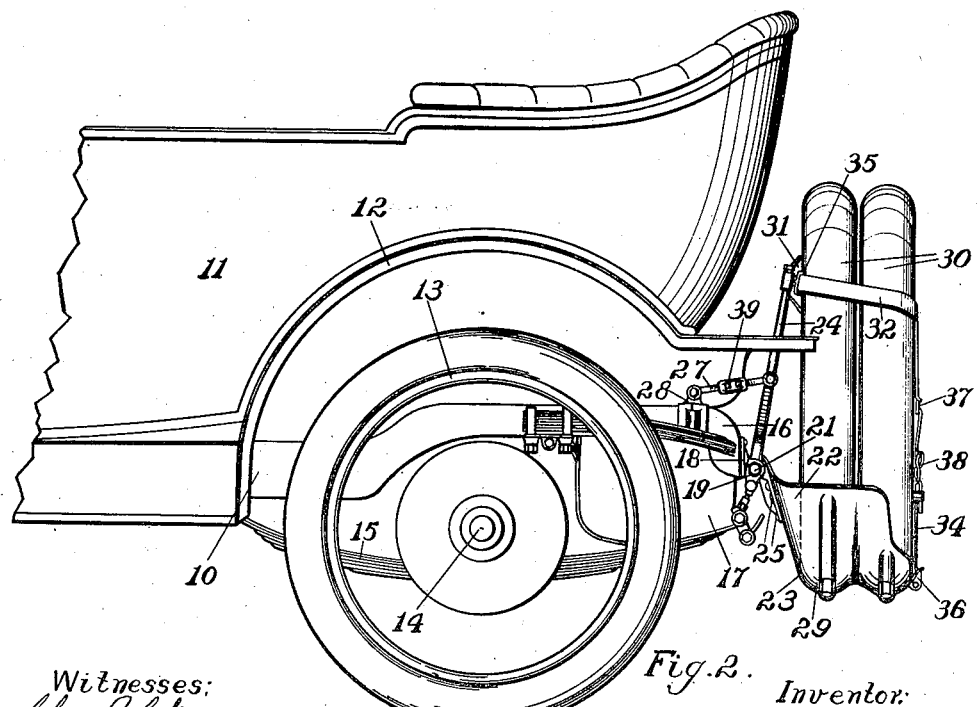

Figure 1 is a rear view of a motor vehicle having one embodiment of the invention therein; Fig. 2 is a side elevation of the vehicle shown in Fig. 1; Fig. 3 is an enlarged rear view of the right half of the tire carrier; Fig. 4 is a vertical section substantially on the line 4—4 of Fig. 3; and Fig. 5 is a perspective detail view.

In the embodiment of the invention shown in the drawings, the tire carrier is illustrated as mounted upon the rear of a motor vehicle, but it will be understood that the carrier may be mounted also upon the side of the vehicle or other convenient place, without departing from the spirit of this invention.

Referring to the drawings, 10 represents the vehicle frame, upon which is mounted a body 11 having fenders 12 over the wheels 13 mounted on the axle 14 which supports the frame through the springs 15. In the drawings, these springs are of the three-quarter elliptic type, part of the spring being cut away in Fig. 2 to illustrate the tire carrier more clearly.

The rear ends 16 of the side bars of the frame 10 are turned down, as shown particularly in Figs. 2 and 4, and the fuel tank 17 is shown as hung from this part of the frame. This rear end of the frame also serves as a support for brackets 18, having eyes 19, through which the ends of a cross rod 20 pass. This rod 20 is secured to the bracket 18, as by nuts 21, thus connecting the ends 16 of the side members of the frame.

A tire carrier 22 comprises a tire supporting or cradle portion 23 and a pair of upright arms 24 at the ends of the cradle. These arms 24 are rigidly secured to the cradle portion 23, as by rivets 25, and they are formed with enlargements 26, through which passes the rod 20, thereby pivotally supporting the tire carrier upon said rod. This construction is probably best shown in Figs. 3 and 4. By reason of the rigid connection of the arms 24 to the supporting portion 23 of the carrier, these two parts bear a definite relation to each other, and the entire carrier is held in a given position about its pivotal support by means of a brace or pair of braces 27, which braces are in the form of links connecting the arms 24 with the horizontal portion of the side members of the frame 10. This latter connection is through a bracket 28 riveted to the frame 10, as shown in the drawings.

The cradle portion 23 of the tire carrier may be formed with either one or two depressions 29 forming seats for the inflated tires 30 mounted on suitable rims, and the upper ends of the arms 24 may be connected by a metal or other strap 31, against which the inner of said tires will rest. The tires may then be secured to the carrier by means of flexible straps 32, 33 and 34, two of which are connected to the upper ends of the arms 24 by means of swivel connections 35, and the other of which is connected to the center of the cradle portion 23, as at 36. The two upper straps are preferably of sufficient length to contact with a center ring 37, and the strap 34 is formed with a buckle 38 and connected with the ring 37, so that all three of the straps may be tightened around the tires and the latter held firmly to the carrier by drawing up on said strap 34. It is believed that this construction will be clearly understood upon reference to the drawings. It will be seen also that upon disconnecting the strap 34 from the ring 37, the other two straps may be thrown up over the tires, and either or both of the latter may be removed from the carrier. Also the tires may be secured in place by simply passing the strap 34 through the ring 37 and tightening this strap by means of the buckle 38.

In Fig. 2, the brace 27 is shown as in the form of an adjustable link having a turnbuckle 39, so that the carrier may be tilted on the rod 20 for inclining the tires more or less toward the vehicle body. On the other hand, if the inclination or position of the tires is to be permanently set, the link 27 may be of non-adjustable form, as shown in Fig. 4, and upon changing the body of the vehicle to one having more or less rear overhang, the links 27 may be replaced by longer or shorter links, as desired.

A specific embodiment of the invention has been described in detail, but it will be understood that the invention is not limited to the exact construction shown, as it will be apparent that changes may be made without departing from the spirit or scope of the invention.

Having thus described my invention, what I claim and desire to secure by Letters Patent is:

1. In a motor vehicle, the combination with the frame, of a tire carrier connected to the frame by a horizontal pivot and having a tire supporting part extending away from the frame, and adjustable braces from a rigid part of said carrier to the frame.

2. In a motor vehicle, the combination with the frame, of a tire carrier directly pivoted to the frame and having a tire supporting part extending away from the frame, and having rigid upright arms, and braces from said arms to the frame.

3. In a motor vehicle, the combination with the frame comprising side members and a rod connecting the side members, of a tire carrier connected to the rod and having a tire supporting part extending beyond the ends of the frame side members, and braces from a rigid part of said carrier to the frame.

4. A tire carrier comprising a tire supporting lower part, secondary supporting upper parts, said parts having three spaced strap connections, and securing means in the form of straps extending from said connections and connected together adjacent the middle of the carrier, one of said straps being readily detachable for the purpose set forth.

5. A tire carrier comprising a tire supporting part, upright arms secured to the ends of said part, a rigid back piece connecting the upper ends of said arms, and straps connected to the upper ends of said arms and to said supporting part and connected together adjacent the middle of the carrier, one of said straps being readily detachable for the purpose set forth.

6. In a motor vehicle, the combination with the frame, of a tire carrier comprising a tire supporting part and a pair of upright arms rigidly secured to the tire supporting part, said carrier being supported on a horizontal pivot on said frame, means for securing the tires to said supporting part and arms, and braces from said arms to the adjacent parts of the frame.

7. A tire carrier comprising a tire supporting part having means at its ends for pivotally supporting the carrier on a vehicle frame, upright arms secured to the ends of said part adjacent said means, a back piece connecting the upper ends of said arms, and straps fastened to the ends of said arms and to said supporting part and adapted to secure the tires in place.

In testimony whereof I affix my signature in the presence of two witnesses.

ALLEN LOOMIS.

Witnesses:
F. L. LLOYD,
LE ROI J. WILLIAMS.